(12) United States Patent
Seo et al.

(10) Patent No.: US 10,871,182 B2
(45) Date of Patent: Dec. 22, 2020

(54) SCREW THREAD STRUCTURE FOR PREVENTING BEING PULLED OUT AND TOOL FOR MANUFACTURING SAME

(71) Applicant: DAE KWANG METAL.CO.LTD, Gimhae-si (KR)

(72) Inventors: Hyeon Woo Seo, Busan (KR); Won Beom Chang, Busan (KR)

(73) Assignee: DAE KWANG METAL.CO.LTD, Gimhae-si (KR)

( * ) Notice: Subject to any disclaimer, the term of this patent is extended or adjusted under 35 U.S.C. 154(b) by 510 days.

(21) Appl. No.: 15/541,022

(22) PCT Filed: Jan. 5, 2016

(86) PCT No.: PCT/KR2016/000027
§ 371 (c)(1),
(2) Date: Jun. 30, 2017

(87) PCT Pub. No.: WO2016/163628
PCT Pub. Date: Oct. 13, 2016

(65) Prior Publication Data
US 2018/0003212 A1    Jan. 4, 2018

(30) Foreign Application Priority Data
Apr. 7, 2015  (KR) ......................... 10-2015-0048798

(51) Int. Cl.
*F16B 39/30*     (2006.01)
*B21H 3/08*      (2006.01)
(Continued)

(52) U.S. Cl.
CPC ............... *F16B 39/30* (2013.01); *B21H 3/02* (2013.01); *B21H 3/08* (2013.01); *B23G 1/02* (2013.01);
(Continued)

(58) Field of Classification Search
CPC ....... F16B 39/30; F16B 33/02; B23G 2210/48
(Continued)

(56) References Cited

U.S. PATENT DOCUMENTS 1,817,295 A * 8/1931 Hugues ................... F16B 39/30
                                                  411/308
1,828,856 A * 10/1931 Bridges ................... F16B 39/30
                                                  411/308
(Continued)

FOREIGN PATENT DOCUMENTS

JP        55-003566 B2    1/1980
JP        59-063213 U     5/1984
(Continued)

OTHER PUBLICATIONS

International Search Report for PCT/KR2016/000027 dated Apr. 12, 2016 from Korean Intellectual Property Office.

*Primary Examiner* — Gary W Estremsky
(74) *Attorney, Agent, or Firm* — Revolution IP, PLLC

(57) ABSTRACT

The present invention provides a looseness-prevention screw thread structure including a screw thread having a predetermined pitch, a no-load flank which is an inclined surface in a direction in which the screw thread is advanced, and a load flank which is an inclined surface in a direction in which the screw thread is retracted, the no-load flank and the load flank being formed at both sides of the screw thread, in which the no-load flank of the screw thread includes: a first tangential portion which abuts against an arc portion formed at a thread crest of an opposing fastening object; and a second tangential portion which has a preset angle with respect to the first tangential portion and abuts against the arc portion.

3 Claims, 18 Drawing Sheets

(51) Int. Cl.
*B21H 3/02* (2006.01)
*B23G 1/02* (2006.01)
*B23G 1/16* (2006.01)
*F16B 33/02* (2006.01)
*B23B 27/06* (2006.01)
*B23G 5/04* (2006.01)
*B23G 5/06* (2006.01)

(52) U.S. Cl.
CPC ............ *B23G 1/16* (2013.01); *F16B 33/02* (2013.01); *B21H 3/025* (2013.01); *B23B 27/065* (2013.01); *B23G 5/04* (2013.01); *B23G 5/06* (2013.01); *B23G 2210/48* (2013.01)

(58) Field of Classification Search
USPC .......................................................... 411/311
See application file for complete search history.

(56) References Cited

U.S. PATENT DOCUMENTS

| | | | | |
|---|---|---|---|---|
| 3,069,961 | A * | 12/1962 | Baubles | F16B 33/02 411/398 |
| 3,247,877 | A * | 4/1966 | Evans | F16B 25/0021 411/311 |
| 4,265,590 | A * | 5/1981 | Davies | F01D 5/081 415/110 |
| 4,334,814 | A * | 6/1982 | McKewan | B21H 3/027 411/311 |
| 4,341,497 | A * | 7/1982 | Downey | F16B 39/30 411/311 |
| 4,432,682 | A * | 2/1984 | McKewan | F16B 33/02 411/311 |
| 4,594,039 | A * | 6/1986 | Witte | F16B 39/30 411/311 |
| 4,601,622 | A * | 7/1986 | Lyon | F16B 39/30 411/311 |
| 4,983,084 | A * | 1/1991 | Gray | F16B 19/05 411/311 |
| 5,242,252 | A * | 9/1993 | Harle | F16B 39/30 411/259 |
| 10,197,086 | B2 * | 2/2019 | Phua | F16B 25/0073 |
| 2006/0140739 | A1 | 6/2006 | Komine | |
| 2012/0195713 | A1 | 8/2012 | Gu et al. | |

FOREIGN PATENT DOCUMENTS

| | | |
|---|---|---|
| JP | 02-004247 Y2 | 1/1990 |
| JP | 2003-004016 A | 1/2003 |
| JP | 2005-140325 A | 6/2005 |
| JP | 2008-519227 A | 6/2008 |
| JP | 2008-208983 A | 9/2008 |
| JP | 2008-307583 A | 12/2008 |
| JP | 5027916 B2 | 6/2012 |
| JP | 2014-037893 A | 2/2014 |
| JP | 2014-206234 A | 10/2014 |
| JP | 2015-010703 A | 1/2015 |
| KR | 10-2005-0039499 A | 4/2005 |
| KR | 10-2012-0136213 A | 12/2012 |

* cited by examiner

[Fig. 1]
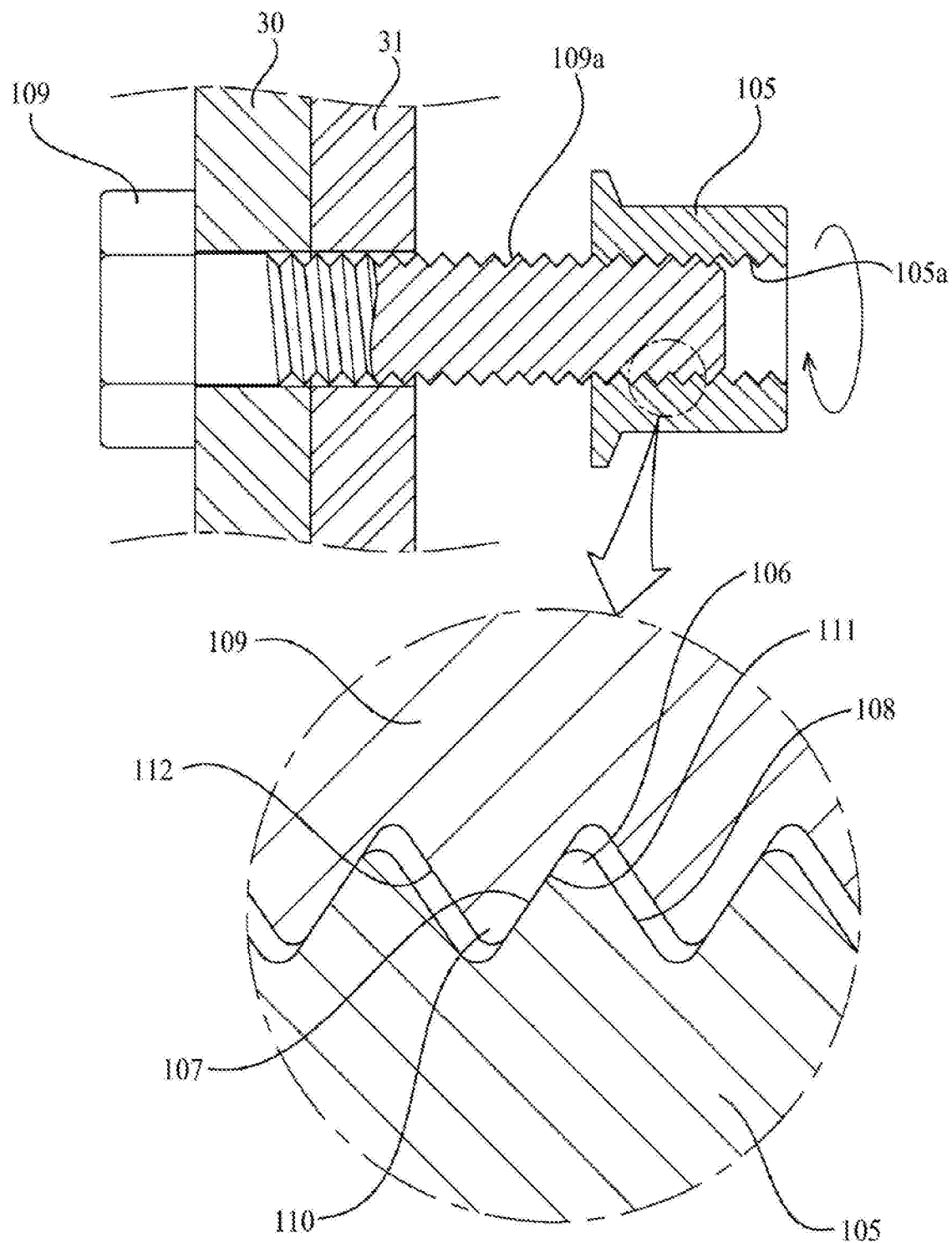

[Fig. 2]
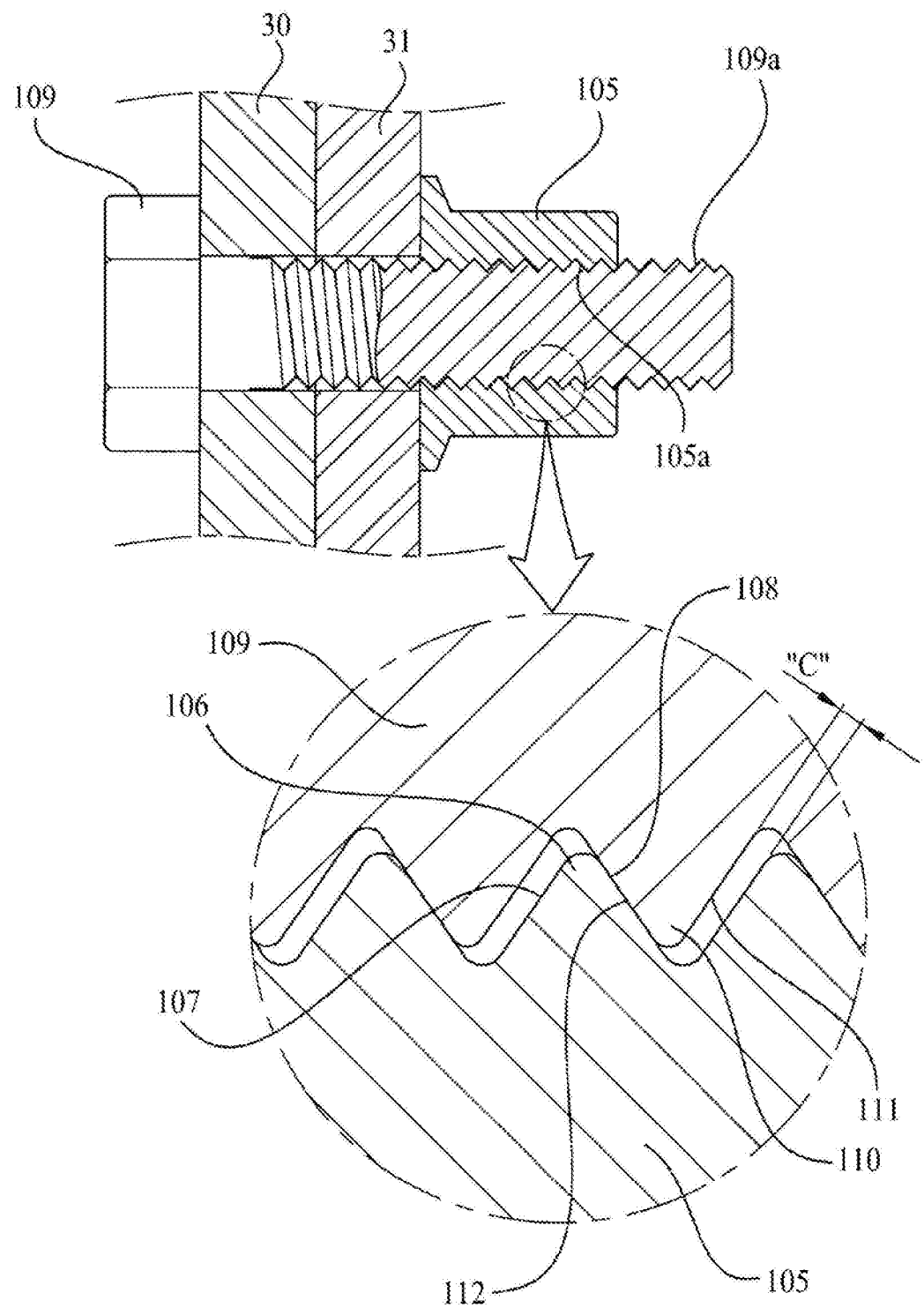

[Fig. 3]
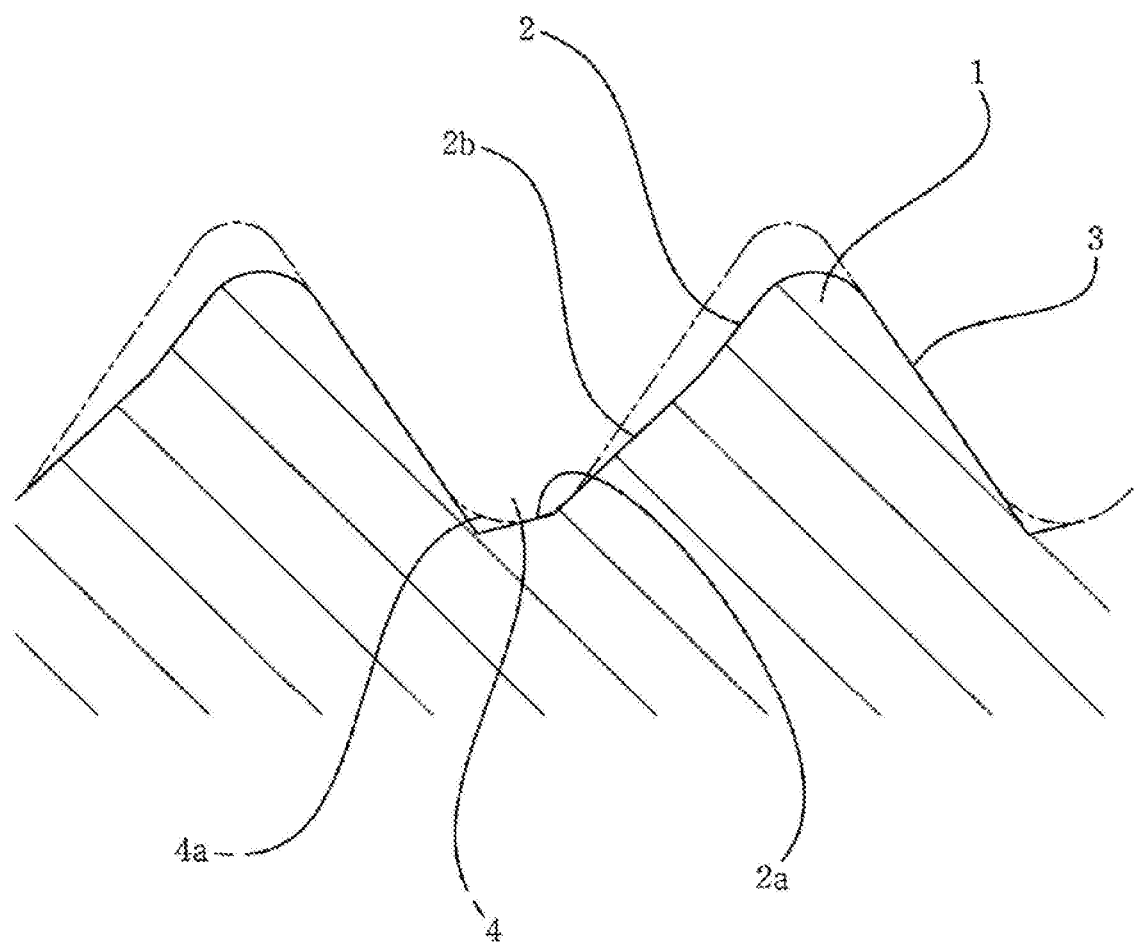

[Fig. 4]
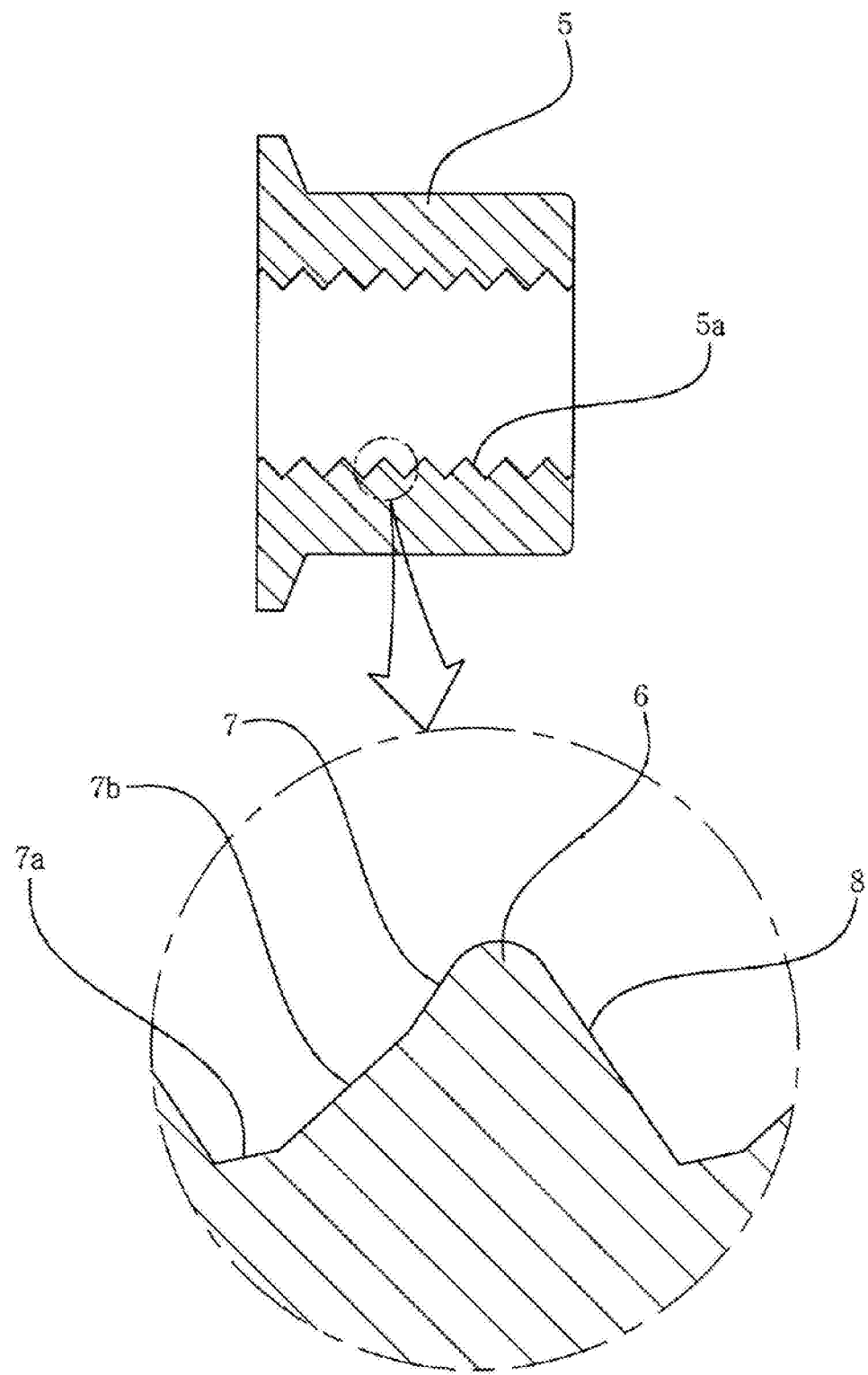

[Fig. 5]
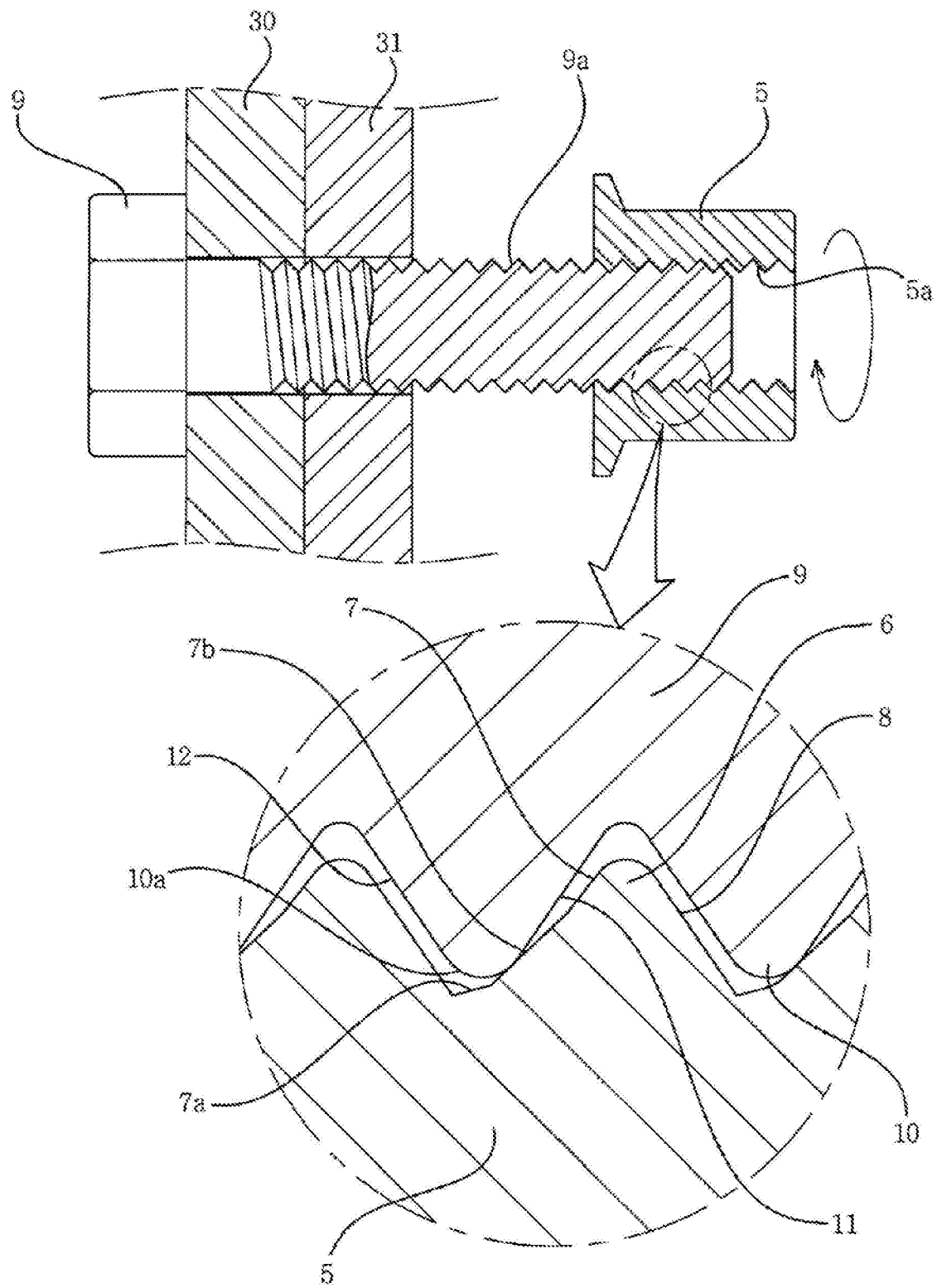

[Fig. 6]
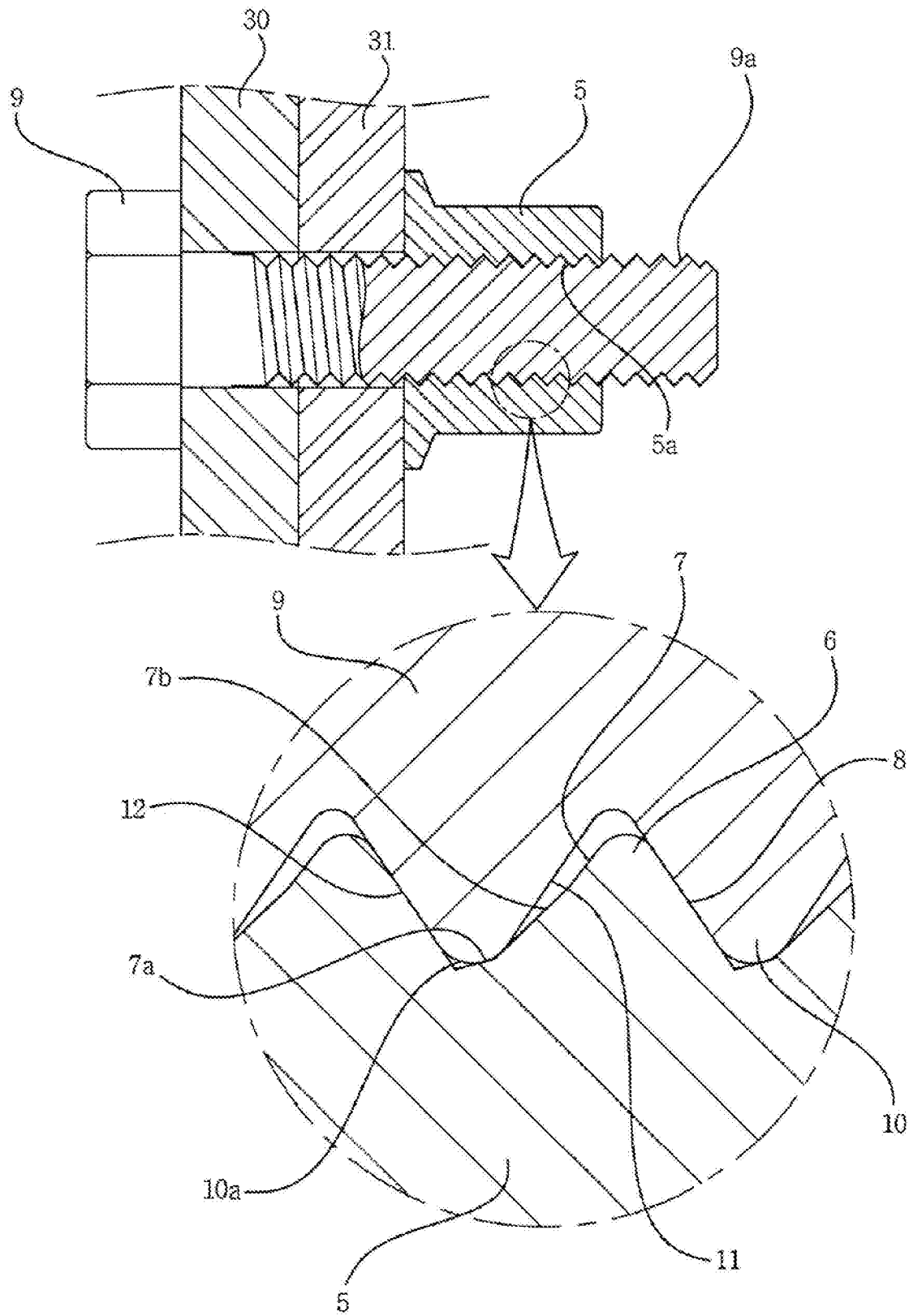

[Fig. 7]
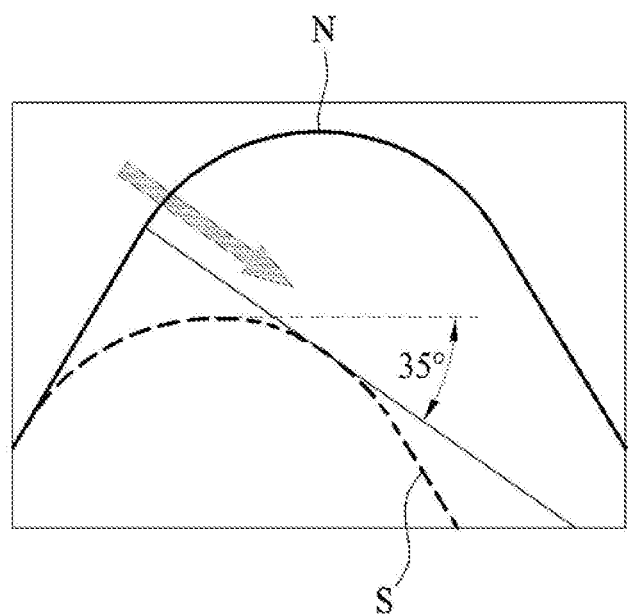
[Fig. 8]
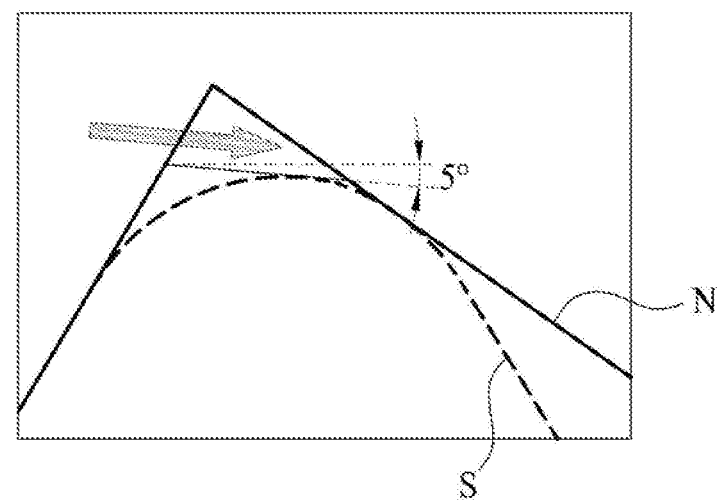

[Fig. 9]
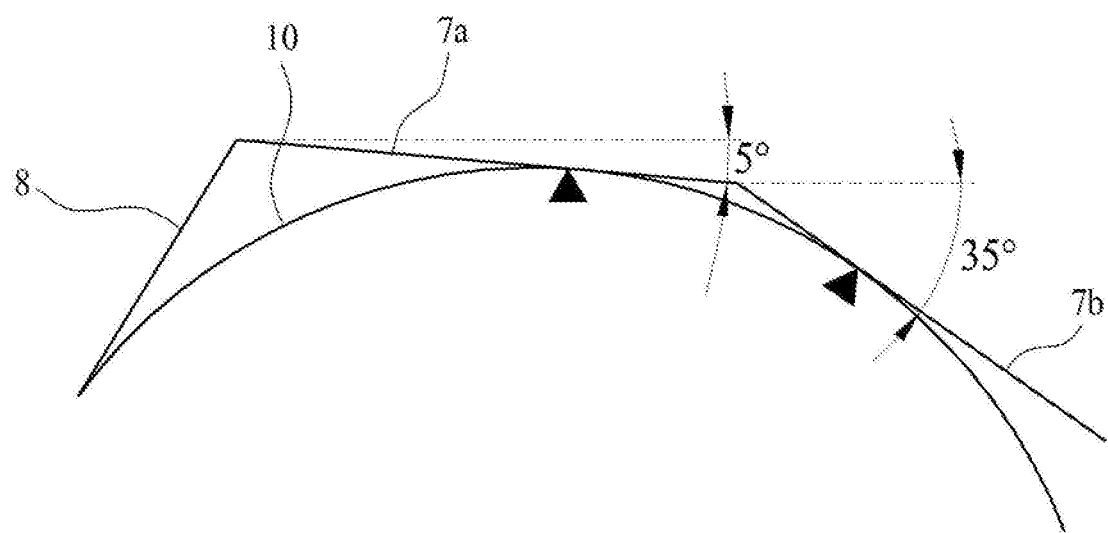

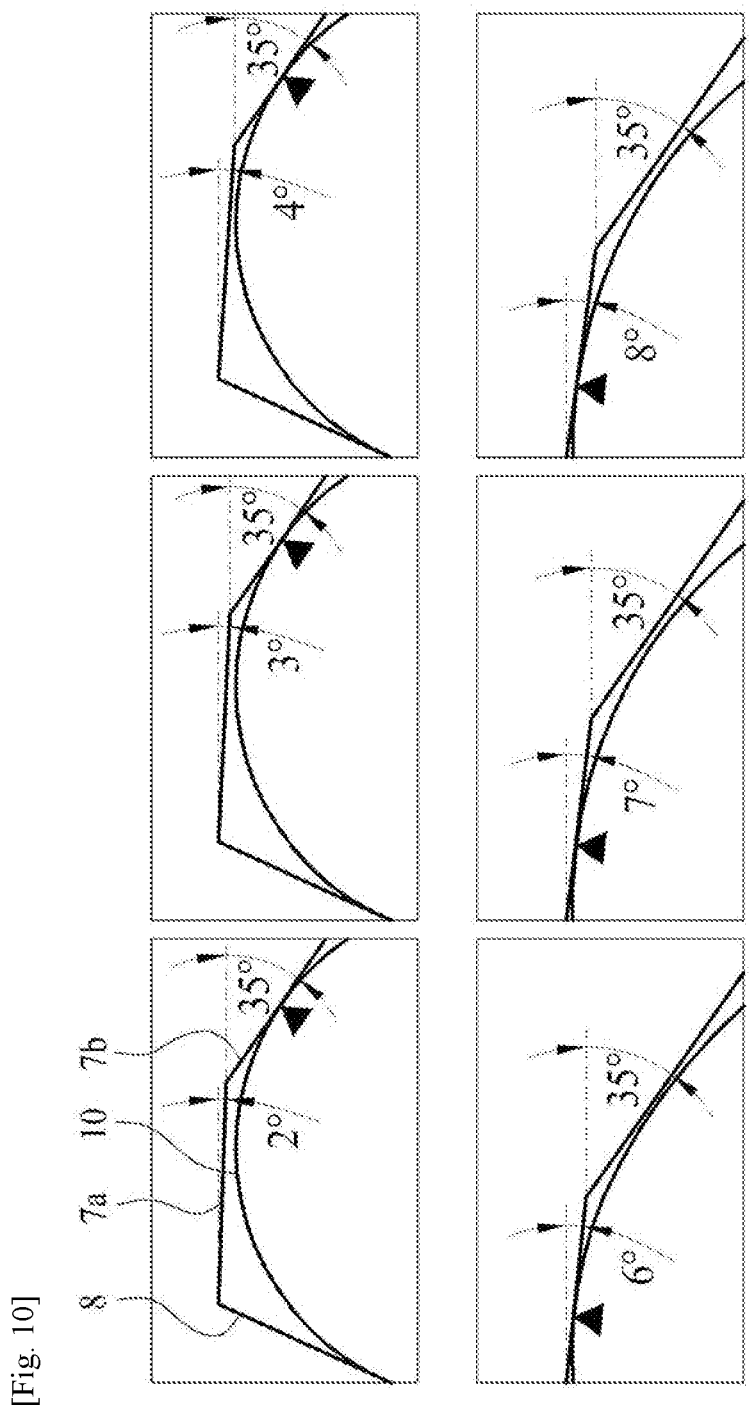

[Fig. 11]
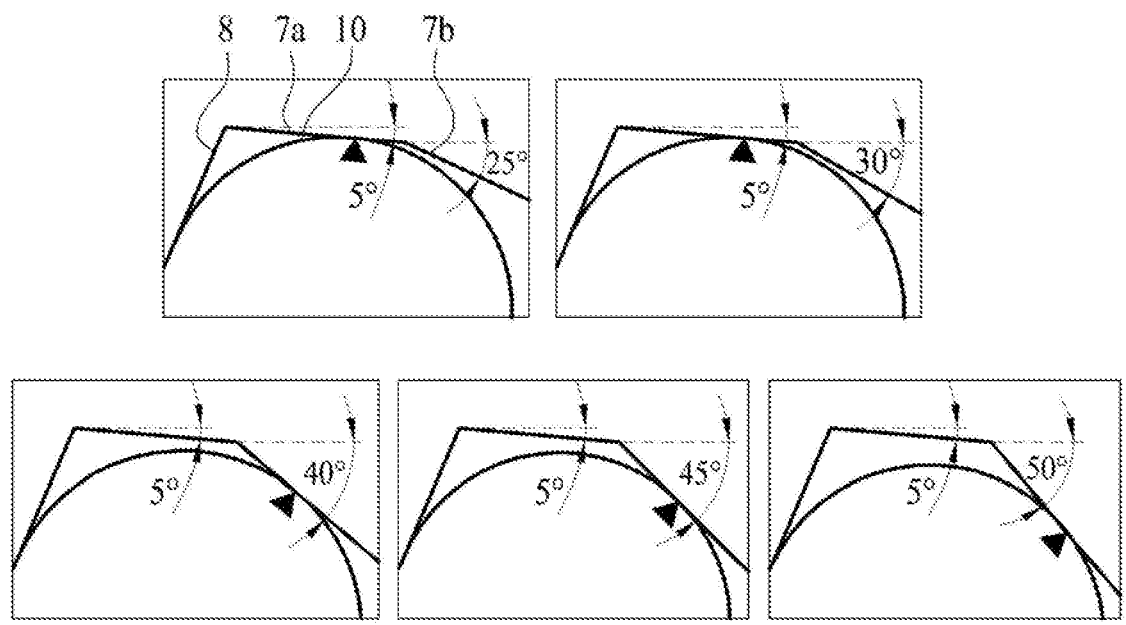

[Fig. 12]
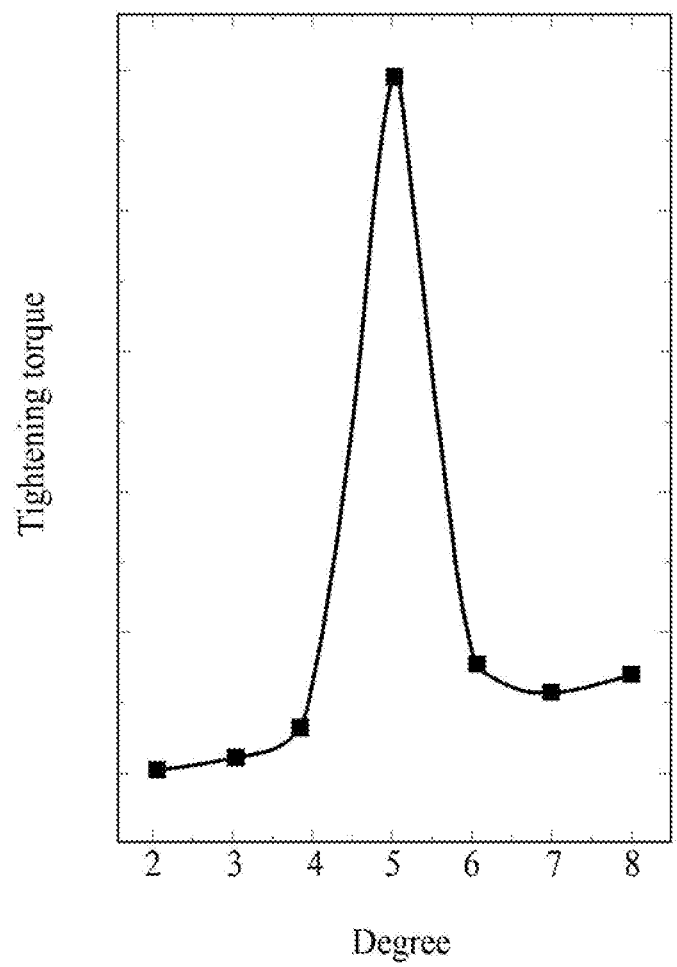

[Fig. 13]
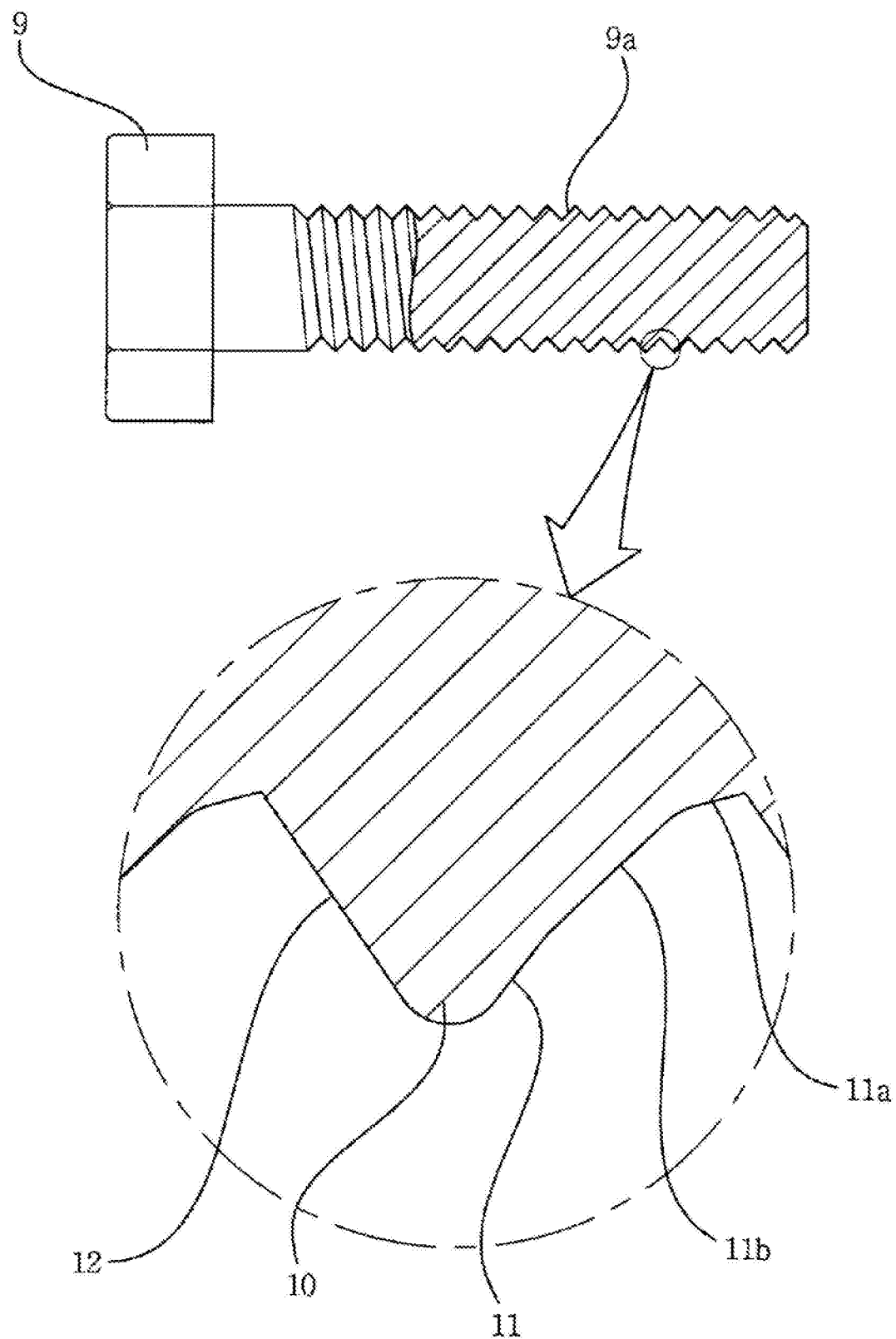

[Fig. 14]
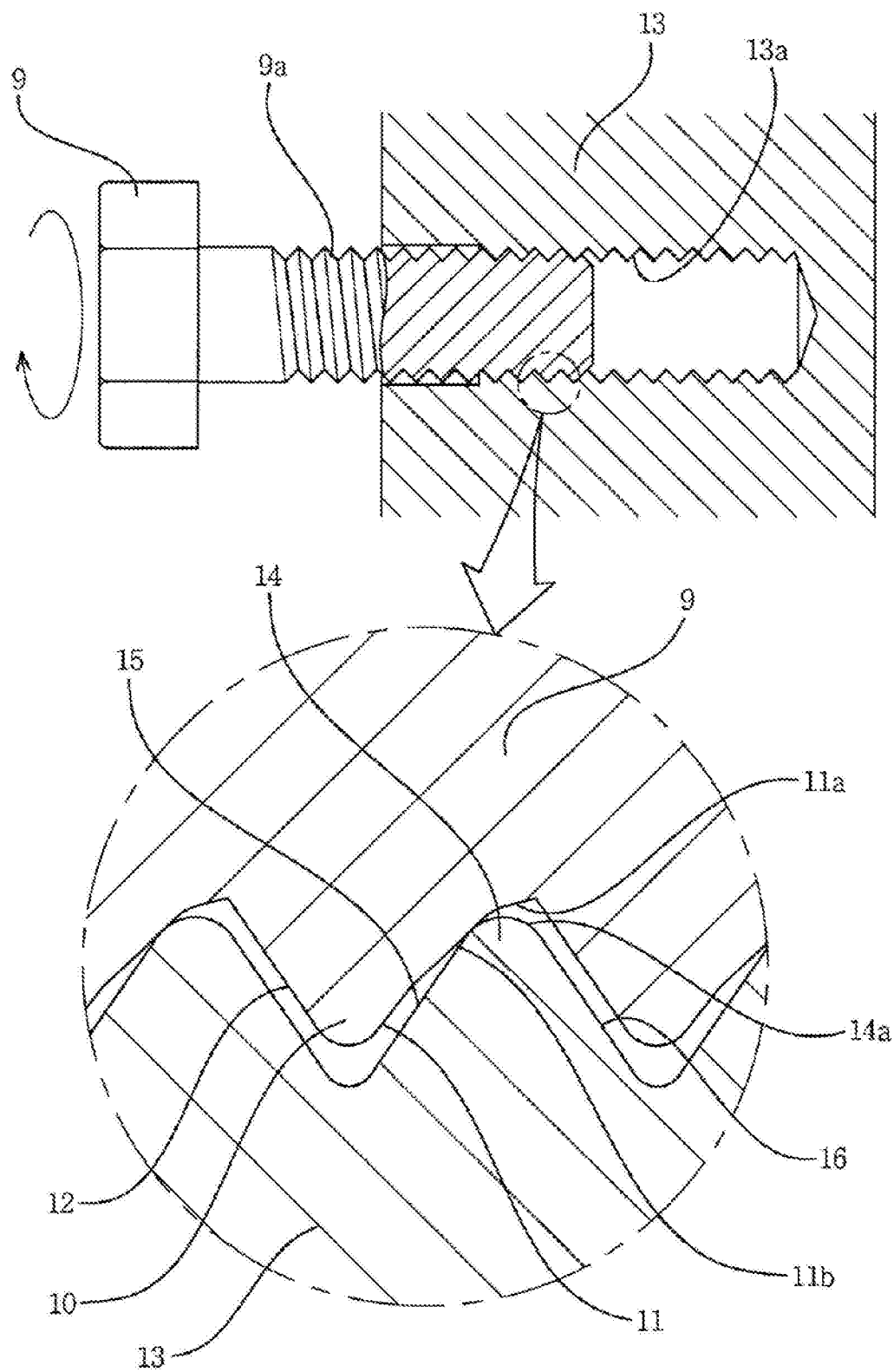

[Fig. 15]
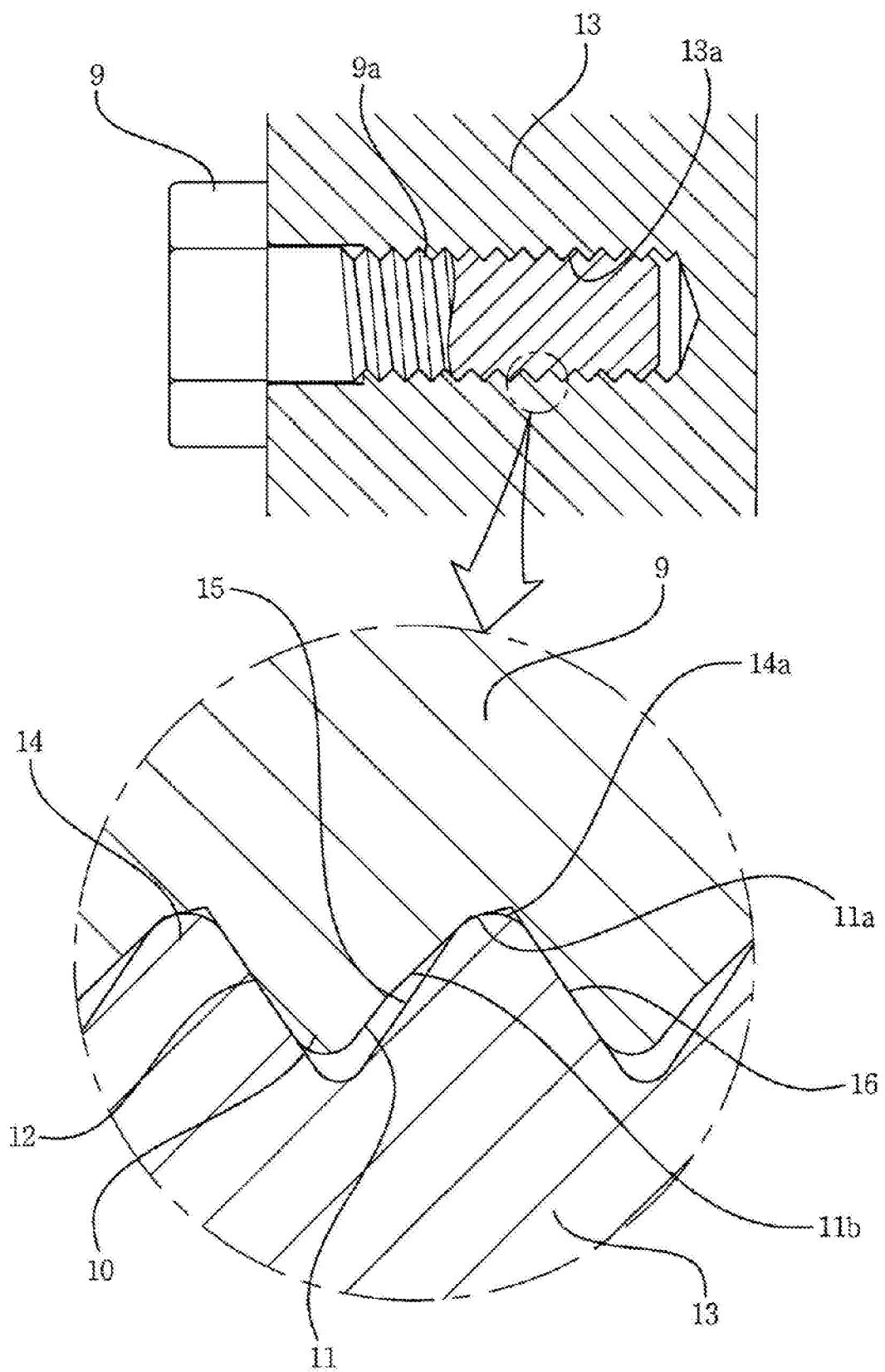

[Fig. 16]
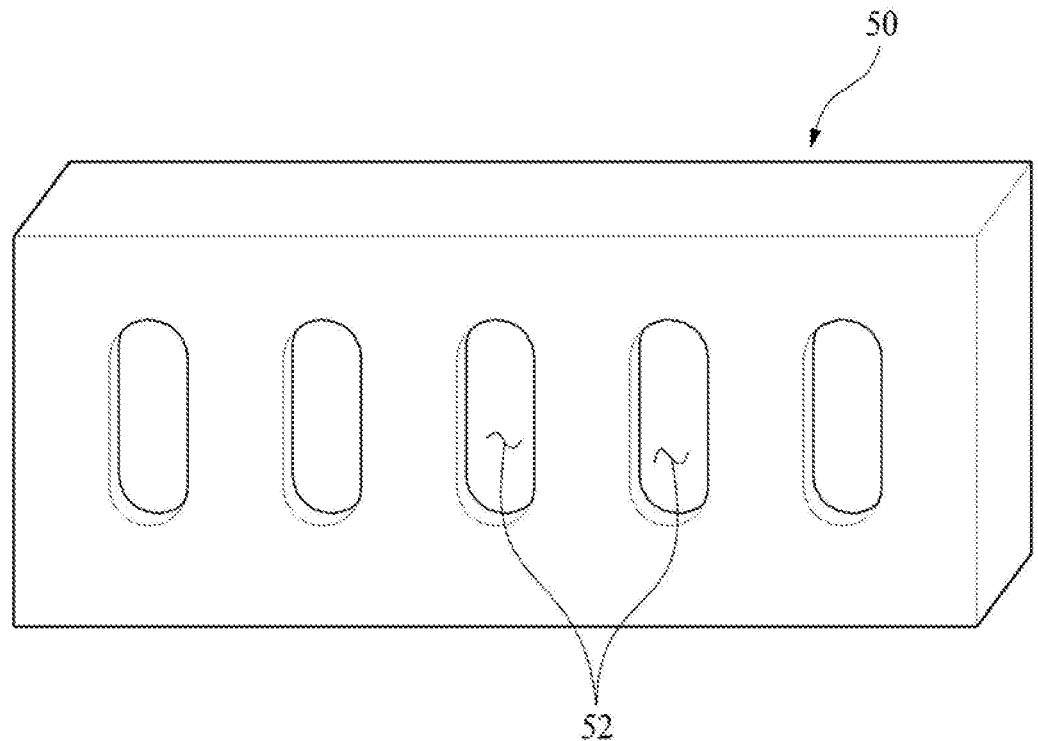
[Fig. 17]
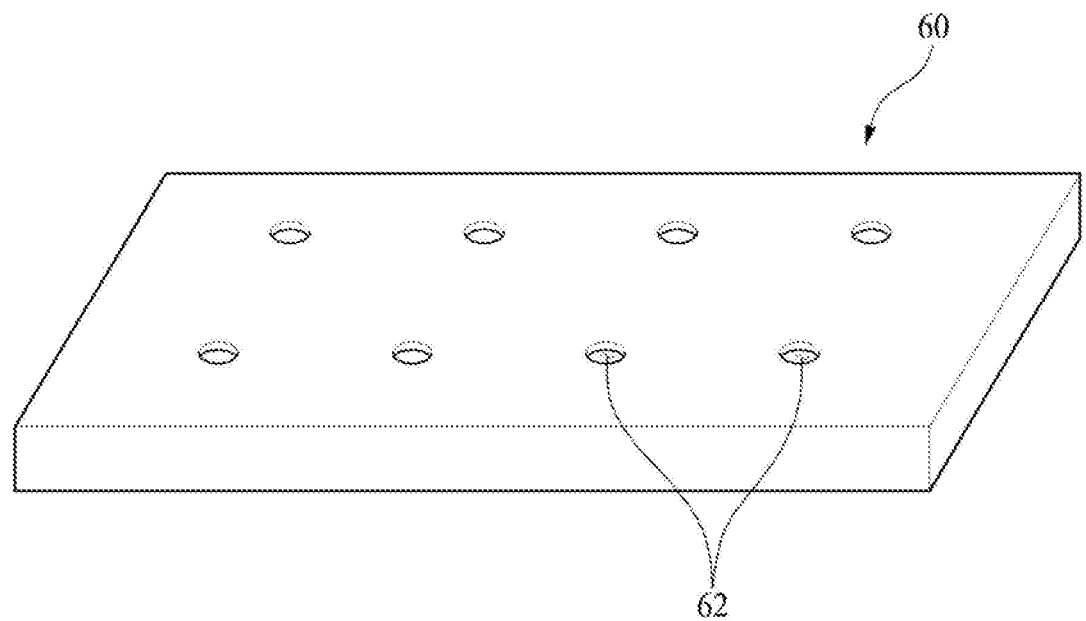

[Fig. 18]
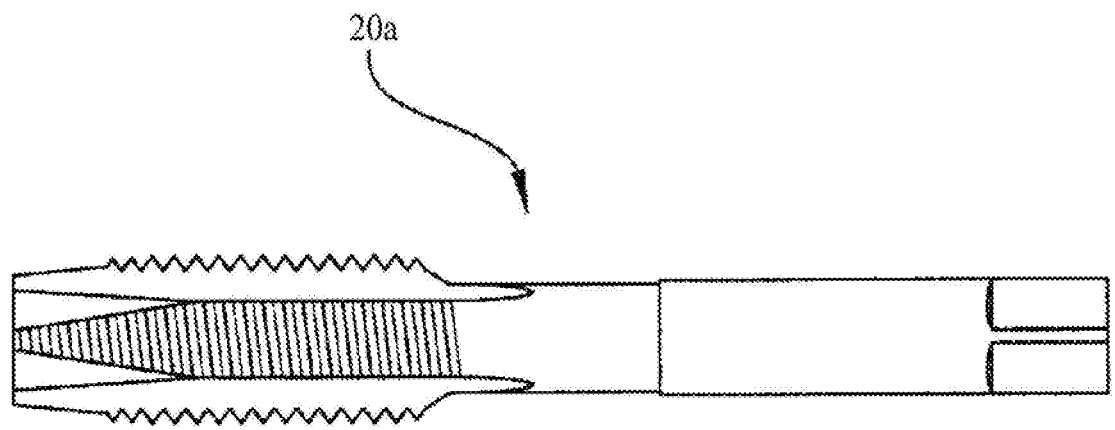
[Fig. 19]
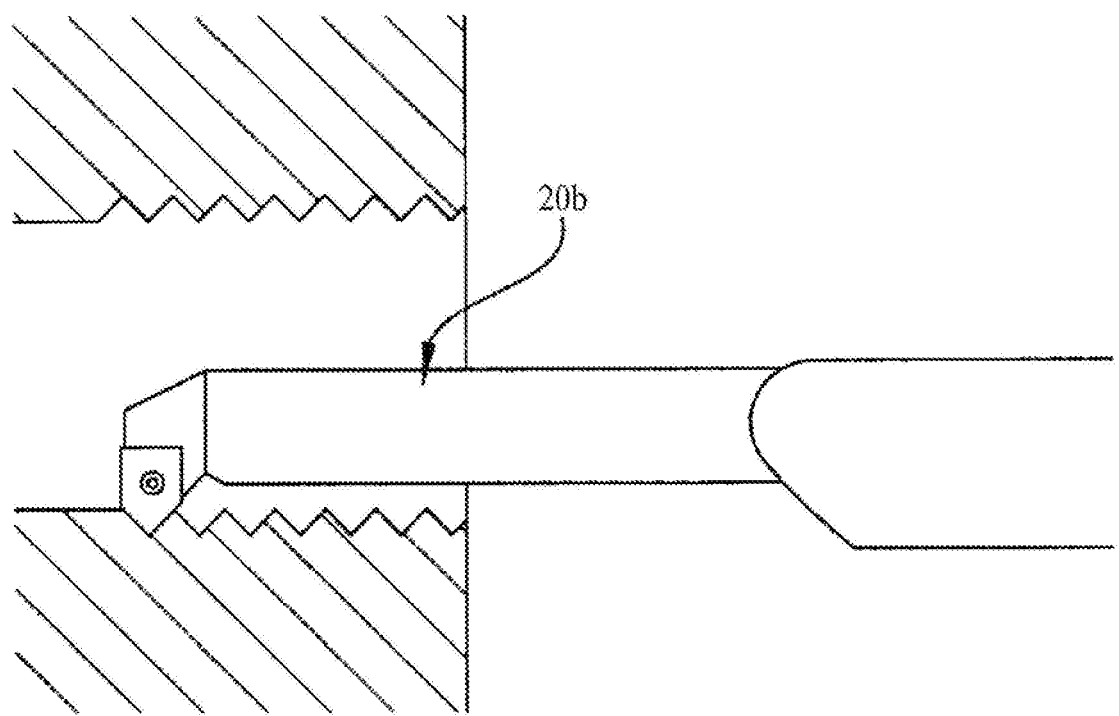

[Fig. 20]
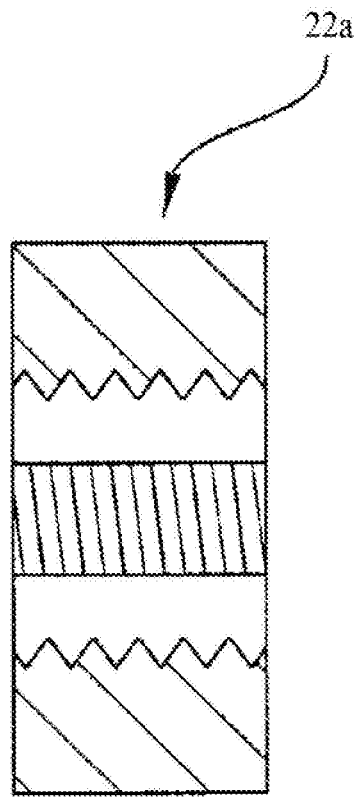
[Fig. 21]
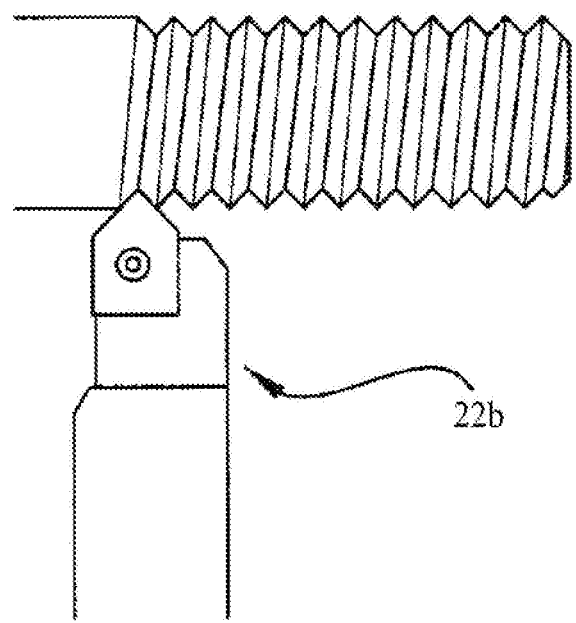

[Fig. 22]
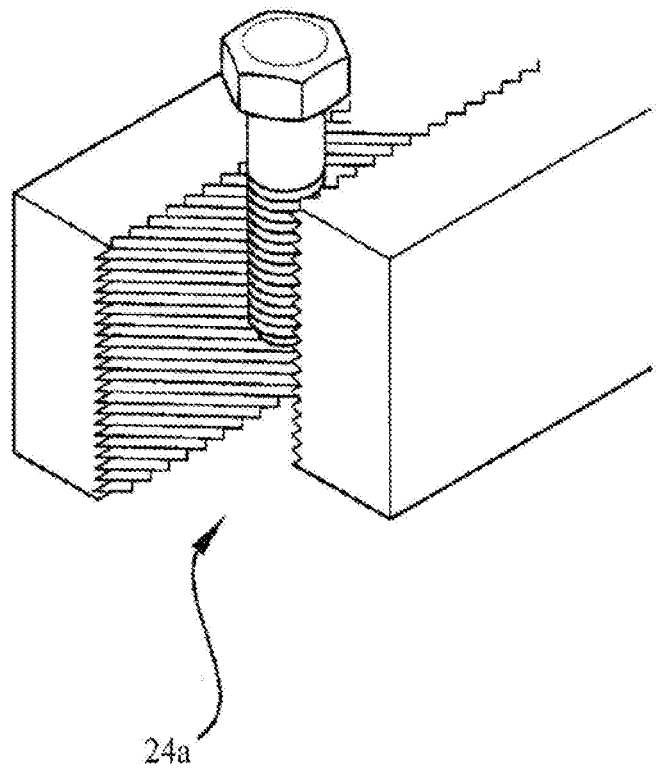
24a
[Fig. 23]
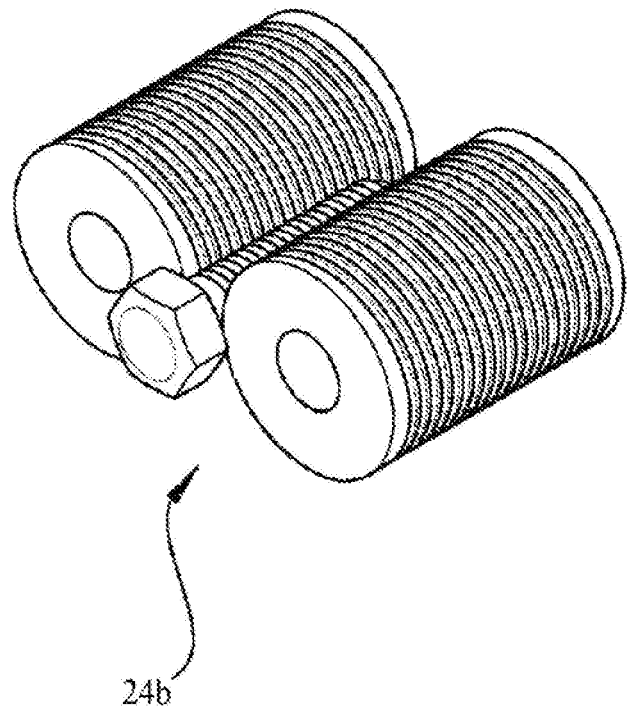
24b

SCREW THREAD STRUCTURE FOR PREVENTING BEING PULLED OUT AND TOOL FOR MANUFACTURING SAME

CROSS REFERENCE TO PRIOR APPLICATIONS

This application is a National Stage Application of PCT International Patent Application No. PCT/KR2016/000027 filed on Jan. 5, 2016, under 35 U.S.C. § 371, which claims priority to Korean Patent Application No. 10-2015-0048798 filed on Apr. 7, 2015, which are all hereby incorporated by reference in their entirety.

TECHNICAL FIELD

The present invention relates to a looseness-prevention screw thread structure and a tool for machining the same, and more particularly, to a looseness-prevention screw thread structure in which a first tangential portion and a second tangential portion are formed on a no-load flank of a screw thread in order to minimize looseness caused by external impact or vibration, and a tool for machining the same.

BACKGROUND ART

In general, screws include an external thread and an internal thread that basically operate as a pair and have appropriate dimensions, and the screws are mainly used to fasten objects.

As representative fastening means using the screws, there are a bolt having the external thread, and a nut having the internal thread, but there occur the following problems when objects are coupled by using the existing bolts and nuts.

When objects are coupled by using the existing bolts and nuts, a bolt 109 is inserted into and penetrates two objects 30 and 31 to be coupled, and then an internal thread portion 105a of a nut 105 is fastened to a protruding external thread portion 109a of the bolt 109, as illustrated in FIG. 1.

Here, a flank refers to an inclined surface that connects a thread crest and a thread root, and the flanks are divided into a no-load flank which is an inclined surface in a direction in which the thread is advanced based on the thread crest, and a load flank which is an inclined surface in a direction in which the thread is retracted.

When the bolt 109 or the nut 105 is rotated to fasten the internal thread portion 105a of the nut 105 to the external thread portion 109a of the bolt 109, a no-load flank 107 of a screw thread 106, which constitutes the internal thread portion 105a of the nut 105, and a no-load flank 111 of a screw thread 110, which constitutes the external thread portion 109a of the bolt 109, come into surface-to-surface contact with each other by axial force which is applied when fastening the internal thread portion 105a of the nut 105 to the external thread portion 109a of the bolt 109.

Further, when the internal thread portion 105a of the nut 105 is completely fastened to the external thread portion 109a of the bolt 109 as illustrated in FIG. 2, a load flank 108 of the nut 105 and a load flank 112 of the bolt 109 strongly and tightly come into surface-to-surface contact with each other by compressive force applied as the bolt 109 and the nut 105 are coupled to each other, and for this reason, strong frictional force is applied between the load flank 108 of the nut 105 and the load flank 112 of the bolt 109, and as a result, a fastened state of the bolt 109 and the nut 105 is maintained.

An assembly tolerance C is typically present between an outer diameter of the bolt 109 and an inner diameter of the nut 105 for the purpose of ease of assembly, and in a case in which the fastened state of the bolt 109 and the nut 105 is maintained only by frictional force applied between the load flank 108 of the nut 105 and the load flank 112 of the bolt 109, there is a problem in that the load flank 108 of the nut 105 and the load flank 112 of the bolt 109, which are in close contact with each other, are separated from each other due to a gap caused by the assembly tolerance C when external impact or vibration is applied, such that frictional force, which is applied only when the load flank 108 of the nut 105 and the load flank 112 of the bolt 109 are in close contact with each other, easily deteriorates or disappears, and as a result, the bolt 109 or the nut 105 is often loosened.

To solve the aforementioned problem, in the related art, there has been used a method of coupling the bolt and the nut in a state in which a spring with a looseness-prevention function or a ring with a reverse rotation prevention protrusion is interposed between the bolt and the nut, a method of filling a portion between the outer diameter of the bolt and the inner diameter of the nut with an adhesive, or silicone or nylon, or the like.

However, according to the threaded engagement method using the looseness-prevention means in the related art, the fastening process cannot be easily performed because the fastening process is performed in a state in which there is almost no assembly tolerance C, the configuration thereof is complicated, and the number of production processes is increased, such that production costs and a selling price are increased overall, and as a result, there is a problem in that the fastening process is limited and applied only to some machines that require precision or to high-priced products, but the fastening process cannot be widely and universally used.

Accordingly, there is a need for a method for solving the aforementioned problems.

DISCLOSURE

Technical Problem

The present invention has been made in an effort to solve the problems in the related art, and an object of the present invention is to effectively prevent looseness caused by external impact or vibration by securely maintaining frictional force applied between load flanks after the threaded engagement.

Technical problems of the present invention are not limited to the aforementioned technical problems, and other technical problems, which are not mentioned above, may be clearly understood by those skilled in the art from the following descriptions.

Technical Solution

To achieve the aforementioned object, the present invention provides a looseness-prevention screw thread structure, including a screw thread having a predetermined pitch, a no-load flank which is an inclined surface in a direction in which the screw thread is advanced, and a load flank which is an inclined surface in a direction in which the screw thread is retracted, the no-load flank and the load flank being formed at both sides of the screw thread, in which the no-load flank of the screw thread includes: a first tangential portion which abuts against an arc portion formed at a thread crest of an opposing fastening object; and a second tangential portion which has a preset angle with respect to the first tangential portion and abuts against the arc portion.

Further, the first tangential portion and the second tangential portion may simultaneously abut against and come into contact with the arc portion in a state in which the screw thread is fastened to the opposing fastening object.

In addition, the second tangential portion may be formed to have a larger angle with respect to a horizontal line than the first tangential portion.

Further, the first tangential portion and the second tangential portion may be formed to have a smaller angle with respect to a horizontal line than the load flank.

In addition, the screw thread may be formed to have a dimension that satisfies the international standard, and the first tangential portion may have an angle of 4° to 6° with respect to a horizontal line.

Further, the first tangential portion may have an angle of 5° with respect to the horizontal line.

In addition, the second tangential portion may have an angle of 35° with respect to the horizontal line.

Further, a tool for machining the looseness-prevention screw thread structure according to the present invention may include machining tools having various shapes for machining the looseness-prevention screw thread structure to make an internal thread or an external thread.

Advantageous Effects

The looseness-prevention screw thread structure and the tool for machining the same according to the present invention for solving the problems have the following effects.

First, the first tangential portion and the second tangential portion, which simultaneously abut against the arc portion formed at the thread crest of the opposing object during the threaded engagement, are formed at the no-load flank which is an inclined surface in the direction in which the screw thread is advanced, such that the frictional force applied between the load flanks is securely maintained after the threaded engagement, and as a result, it is possible to effectively prevent looseness caused by external impact or vibration.

Second, the tool for machining the looseness-prevention screw thread according to the present invention may easily machine the screw thread structure, which has the first tangential portion and the second tangential portion formed at the no-load flank of the screw thread, in order to make an internal thread or an external thread.

The effects of the present invention are not limited to the aforementioned effects, and other effects, which are not mentioned above, will be clearly understood by those skilled in the art from the claims.

DESCRIPTION OF DRAWINGS

FIG. 1 is a view illustrating a process of fastening a general bolt and a general nut.

FIG. 2 is a view illustrating a state in which the general bolt and the general nut are fastened.

FIG. 3 is a view illustrating a looseness-prevention screw thread structure according to the present invention.

FIGS. 4 to 6 are views illustrating an exemplary embodiment in which the looseness-prevention screw thread structure according to the present invention is applied to a nut.

FIGS. 7 and 8 are views illustrating a process of machining the looseness-prevention screw thread structure according to the present invention.

FIG. 9 is a view illustrating angles of a first tangential portion and a second tangential portion which are optimized for the looseness-prevention screw thread structure according to the present invention.

FIG. 10 is a view illustrating a state of a contact point in accordance with a change in angle of the first tangential portion of the looseness-prevention screw thread structure according to the present invention.

FIG. 11 is a view illustrating a state of a contact point in accordance with a change in angle of the second tangential portion of the looseness-prevention screw thread structure according to the present invention.

FIG. 12 is a graph illustrating the amount of change in fastening torque with respect to a change in angle of the first tangential portion of the looseness-prevention screw thread structure according to the present invention.

FIGS. 13 to 15 are views illustrating an exemplary embodiment in which the looseness-prevention screw thread structure according to the present invention is applied to a bolt.

FIGS. 16 and 17 are views illustrating a state of a test apparatus for testing fastening force of the looseness-prevention screw thread structure according to the present invention.

FIGS. 18 and 19 are views illustrating machining tools for machining the looseness-prevention screw thread structure according to the present invention to make an internal thread.

FIGS. 20 to 23 are views illustrating machining tools for machining the looseness-prevention screw thread structure according to the present invention to make an external thread.

BEST MODE

Hereinafter, an exemplary embodiment of the present invention for specifically accomplishing the objects of the present invention will be described with reference to the accompanying drawings. In the description of the present exemplary embodiment, like terms and like reference numerals are used for like configurations, and additional descriptions will be omitted.

FIG. 3 is a view illustrating a looseness-prevention screw thread structure according to the present invention.

As illustrated in FIG. 3, the looseness-prevention screw thread structure according to the present invention has a screw thread 1 having a predetermined pitch, and a no-load flank 2, which is an inclined surface in a direction in which the screw thread 1 is advanced, and a load flank 3, which is an inclined surface in a direction in which the screw thread is retracted, are formed at both sides of the screw thread 1.

Meanwhile, the flank refers to an inclined surface that connects a thread crest and a thread root, and the flanks are divided into the no-load flank 2 which is the inclined surface in the direction in which the screw thread 1 is advanced based on the thread crest, and the load flank 3 which is the inclined surface in the direction in which the screw thread 1 is retracted.

The reason why the flanks formed at both sides of the screw thread 1 are divided into the no-load flank 2 and the load flank 3 will be described below.

In general, during the threaded engagement, the no-load flanks 2 come into contact with each other first, and in this case, no load is applied between the flanks that are in contact with each other. Further, the load flanks 3 come into contact with each other after the threaded engagement is completed, and in this case, a high load is applied between the flanks that are in contact with each other.

In this screw thread structure, the no-load flank according to the present invention includes a first tangential portion 2a and a second tangential portion 2b. The first tangential portion 2a and the second tangential portion 2a are formed to simultaneously abut against an arc portion 4a formed at a crest of a screw thread 4 of an opposing fastening object that corresponds to the screw thread 1, and particularly, the second tangential portion 2b is formed to form a preset angle with respect to the first tangential portion 2a.

In this case, the arc portion 4a formed at the crest of the screw thread 4 refers to a portion made by rounding a crest of a screw thread in order to prevent the occurrence of foreign substances which hinders the fastening process while an end of the crest is easily damaged during the fastening process in a case in which the crest of the screw thread is formed to be pointy during a screw machining process.

In the case in which the first tangential portion 2a and the second tangential portion 2b are formed at the no-load flank 2 of the screw thread 1 as described above, during the threaded engagement, a load flank of the screw thread 4 of the opposing fastening object comes into close contact with the load flank 3 of the screw thread 1, and simultaneously, the arc portion 4a formed at the crest of the screw thread 4 of the opposing fastening object strongly comes into contact with the first tangential portion 2a and the second tangential portion 2b.

In this case, when the arc portion 4a formed at the crest of the screw thread 4 of the opposing fastening object strongly comes into contact with the first tangential portion 2a and the second tangential portion 2b formed at the no-load flank 2 of the screw thread 1, the arc portion 4a formed at the crest of the screw thread 4 of the opposing fastening object locally deforms the first tangential portion 2a and the second tangential portion 2b, thereby forming a securely fixed state.

In this state, the load flanks, which are in close contact with each other, are not easily separated from each other even though external impact or vibration is applied, and as a result, frictional force applied between the load flanks is securely maintained after the threaded engagement. Therefore, it is possible to effectively prevent looseness caused by external impact or vibration.

Meanwhile, fastening force may be more increased when the first tangential portion 2a and the second tangential portion 2b simultaneously abut against and come into close contact with the arc portion 4a in a state in which the screw thread 1 is fastened to the opposing fastening object.

Further, in the present exemplary embodiment, the second tangential portion 2b is formed to have a larger angle with respect to a horizontal line than the first tangential portion 2a. The reason is to allow the first tangential portion 2a and the second tangential portion 2b to come into contact with the arc portion 4a of the opposing fastening object while surrounding the arc portion 4a.

In addition, the first tangential portion 2a and the second tangential portion 2b are formed to have a smaller angle with respect to the horizontal line than the load flank 3. The reason is to allow the load flank 3 to come into contact with an overall area of the opposing fastening object in the state in which the first tangential portion 2a and the second tangential portion 2b are in contact with the arc portion 4a of the opposing fastening object.

The looseness-prevention screw thread structure according to the present invention, which is configured as described above, may be applied to both an internal thread and an external thread, and first, an exemplary embodiment in which the looseness-prevention screw thread structure is applied to the internal thread will be described with reference to FIGS. 4 to 6.

As illustrated in FIG. 4, in a case in which the looseness-prevention screw thread structure according to the present invention is applied to the internal thread, a first tangential portion 7a and a second tangential portion 7b are formed at a no-load flank 7 of a screw thread 6 provided in an internal thread portion 5a of a nut 5.

In the case in which the first tangential portion 7a and the second tangential portion 7b are formed at the no-load flank 7 of the screw thread 6 provided in the internal thread portion 5a of the nut 5 as described above, the no-load flank 7 of the screw thread 6, which constitutes the internal thread portion 5a of the nut 5, comes into contact with a no-load flank 11 of a screw thread 10, which constitutes an external thread portion 9a of a bolt 9, by axial force applied during the engagement when the nut 5 is rotated to fasten the internal thread portion 5a of the nut 5 to the external thread portion 9a of the bolt 9 as illustrated in FIG. 5.

In this case, the bolt 9 and the nut 5 are not fastened in a state in which the no-load flank 11 of the screw thread 10, which constitutes the external thread portion 9a of the bolt 9, and the no-load flank 7 of the screw thread 6, which constitutes the internal thread portion 5a of the nut 5, are in surface-to-surface contact with each other over a large area, but the bolt 9 and the nut 5 are fastened in a state in which an arc portion 10a formed at a crest of the screw thread 10 of the bolt 9 is in point-to-point contact with the second tangential portion 7b of the no-load flank 7 provided in the screw thread 6 of the nut 5.

Further, as illustrated in FIG. 6, when the internal thread portion 5a of the nut 5 is completely fastened to the external thread portion 9a of the bolt 9, compressive force is applied due to the engagement between the bolt 9 and the nut 5, a load flank 8 of the nut 5 and a load flank 12 of the bolt 9 strongly and tightly come into surface-to-surface close contact with each other, and simultaneously, the arc portion 10a formed at the crest of the screw thread 10 of the bolt 9 strongly comes into contact with the first tangential portion 7a and the second tangential portion 7b formed at the no-load flank 7 of the screw thread 6 of the nut 5.

In this case, when the arc portion 10a formed at the crest of the screw thread 10 of the bolt 9 strongly comes into contact with the first tangential portion 7a and the second tangential portion 7b formed at the no-load flank 7 of the screw thread 6 of the nut 5, the arc portion 10a formed at the crest of the screw thread 10 of the bolt 9 locally deforms the first tangential portion 7a and the second tangential portion 7b, thereby forming a securely fixed state.

In this state, the load flanks, which are in close contact with each other, are not easily separated from each other even though external impact or vibration is applied, and as a result, frictional force applied between the load flanks is securely maintained after the threaded engagement, thereby effectively preventing looseness caused by external impact or vibration.

Hereinafter, a process of machining the screw thread and optimum angles of the first tangential portion 7a and the second tangential portion 7b will be described.

FIGS. 7 and 8 are views illustrating a process of machining the looseness-prevention screw thread structure according to the present invention, and FIG. 9 is a view illustrating angles of the first tangential portion and the second tangential portion optimized for the looseness-prevention screw thread structure according to the present invention.

As illustrated in FIGS. 7 and 8, the process of machining the looseness-prevention screw thread structure according to the present invention will be described below.

First, as illustrated in FIG. 7, a non-machined screw thread N is primarily machined so that the screw thread abuts against a reference curve S, thereby forming the second tangential portion. The reference curve S is set to correspond to the arc portion of the opposing fastening object in consideration of an effective diameter of the bolt or the nut.

Further, the second tangential portion is machined in a straight line shape from the load flank so that the second tangential portion abuts against the reference curve S.

Thereafter, as illustrated in FIG. 8, the non-machined screw thread N with the machined second tangential portion is secondarily machined so that the screw thread abuts against the reference curve S, thereby forming the first tangential portion. Similar to the second tangential portion, the first tangential portion is also machined in a straight line shape from the load flank in a direction of the second tangential portion so that the first tangential portion abuts against the reference curve S.

As illustrated in FIG. 9, in the machined screw thread structure, the first tangential portion 7a and the second tangential portion 7b may simultaneously come into close contact with the screw thread 10 of the opposing fastening object in a case in which the first tangential portion 7a has an angle of 5° with respect to the horizontal line and the second tangential portion 7b has an angle of 35° with respect to the horizontal line.

The screw threads of the bolt and the nut are standardized based on the international standard (ISO), and thus a pitch, an inner diameter, an effective diameter, a root diameter, and the like of the screw thread are increased at a predetermined rate in accordance with sizes of the bolt and the nut. The following Table 1 shows dimensions in accordance with sizes of the nut based on ISO68 and ISO268.

TABLE 1

| Standard | Pitch | Thread Height | Outer Diameter | Effective Diameter | Root Diameter |
| --- | --- | --- | --- | --- | --- |
| M1 | 0.25 | 0.135 | 1 | 0.838 | 0.729 |
| M2 | 0.4 | 0.217 | 2 | 1.740 | 1.567 |
| M3 | 0.5 | 0.271 | 3 | 2.675 | 2.459 |
| M4 | 0.7 | 0.379 | 4 | 3.545 | 3.242 |
| M5 | 0.8 | 0.433 | 5 | 4.480 | 4.134 |
| M6 | 1 | 0.541 | 6 | 5.350 | 4.917 |
| M7 | 1 | 0.541 | 7 | 6.350 | 5.917 |
| M8 | 1.25 | 0.677 | 8 | 7.188 | 6.647 |
| M9 | 1.25 | 0.677 | 9 | 8.188 | 7.647 |
| M10 | 1.5 | 0.812 | 10 | 9.026 | 8.376 |
| M11 | 1.5 | 0.812 | 11 | 10.026 | 9.376 |
| M12 | 1.75 | 0.947 | 12 | 10.863 | 10.106 |
| M14 | 2 | 1.083 | 14 | 12.701 | 11.835 |

As described above, a ratio of the thread height to the pitch of the screw thread is constant regardless of the sizes of the bolt and the nut, and the angle of the screw thread is fixed to 60°, such that an optimum angle of the screw thread may be equally calculated even though the bolt and the nut depend on any standard.

That is, an optimum condition having maximum fastening force may be obtained in a case in which the first tangential portion 7a is machined to have an angle of 5° and the second tangential portion 7b is machined to have an angle of 35°.

To prove the result, an experiment was performed while changing the angles of the first tangential portion 7a and the second tangential portion 7b.

FIG. 10 is a view illustrating a state of a contact point in accordance with a change in angle of the first tangential portion 7a of the looseness-prevention screw thread structure according to the present invention, and FIG. 11 is a view illustrating a state of the contact point in accordance with a change in angle of the second tangential portion 7b of the looseness-prevention screw thread structure according to the present invention.

As can be seen from both FIGS. 10 and 11, in a case in which any one condition of the first tangential portion 7a and the second tangential portion 7b is fixed and the other condition is changed, any one of the first tangential portion 7a and the second tangential portion 7b is separated from the screw thread 10 of the opposing fastening object without abutting against the screw thread 10 of the opposing fastening object.

That is, the first tangential portion 7a and the second tangential portion 7b simultaneously abut against the screw thread 10 of the opposing fastening object in a case in which the first tangential portion 7a is machined to have an angle of 5° and the second tangential portion 7b is machined to have an angle of 35°, and as a result, maximum fastening force may be generated.

FIG. 12 is a graph illustrating the amount of change in fastening torque with respect to a change in angle of the first tangential portion of the looseness-prevention screw thread structure according to the present invention.

As illustrated in FIG. 12, a differential value of the graph is rapidly increased when the angle of the first tangential portion is between 4° and 6°, and therefore, it can be seen that fastening force is significantly increased when the angle of the first tangential portion is between 4° and 6°.

In addition, it can be confirmed that in a case in which the angle of the first tangential portion is 5°, the first tangential portion and the second tangential portion simultaneously abut against the screw thread of the opposing fastening object such that maximum fastening force is obtained.

From the foregoing, optimum angles of the first tangential portion and the second tangential portion and reference data have been described, and hereinafter, an example in which the looseness-prevention screw thread structure according to the present invention is applied to an external thread will be described.

As illustrated in FIG. 13, in a case in which the looseness-prevention screw thread structure according to the present invention is applied to the external thread, a first tangential portion 11a and a second tangential portion 11b are formed at the no-load flank 11 of the screw thread 10 provided in the external thread portion 9a of the bolt 9.

In the case in which the first tangential portion 11a and the second tangential portion 11b are formed at the no-load flank 11 of the screw thread 10 provided in the external thread portion 9a of the bolt 9 as described above, the no-load flank 11 of the screw thread 10, which constitutes the external thread portion 9a of the bolt 9, comes into contact with a no-load flank 15 of a screw thread 14, which constitutes an internal thread portion 13a of an opposing object 13, by axial force applied during the engagement when the bolt 9 is rotated to fasten the external thread portion 9a of the bolt 9 to the internal thread portion 13a of the opposing object 13 as illustrated in FIG. 14.

In this case, the bolt 9 and the opposing object 13 are not fastened in a state in which the no-load flank 11 of the screw thread 10, which constitutes the external thread portion 9a of the bolt 9, and the no-load flank 15 of the screw thread 14, which constitutes the internal thread portion 13a of the opposing object 13, are in surface-to-surface contact with each other over a large area, but the bolt 9 and the opposing object 13 are fastened in a state in which the second tangential portion 11b of the no-load flank 11 of the screw thread 10 of the bolt 9 and an arc portion 14a formed at a crest of the screw thread 14 of the opposing object 13 are in point-to-point contact with each other.

Further, when the external thread portion 9a of the bolt 9 is completely fastened to the internal thread portion 13a of the opposing object 13 as illustrated in FIG. 15, compressive force is applied because of the engagement between the bolt 9 and the opposing object 13.

Therefore, a load flank 16 of the opposing object 13 and the load flank 12 of the bolt 9 strongly and tightly come into surface-to-surface close contact with each other, and simultaneously, the arc portion 14a formed at the crest of the screw thread 14 of the opposing object 13 strongly comes into contact with the first tangential portion 11a and the second tangential portion 11b formed at the no-load flank 11 of the screw thread 10 of the bolt 9.

In this case, when the arc portion 14a formed at the crest of the screw thread 14 of the opposing object 13 strongly comes into contact with the first tangential portion 11a and the second tangential portion 11b formed at the no-load flank 11 of the screw thread 10 of the bolt 9, the arc portion 14a formed at the crest of the screw thread 14 of the opposing object 13 locally deforms the first and second tangential portions 11a and 11b, thereby forming a securely fixed state.

Therefore, the load flanks, which are in close contact with each other, are not easily separated from each other even though external impact or vibration is applied, and as a result, frictional force applied between the load flanks is securely maintained after the threaded engagement, thereby effectively preventing looseness caused by external impact or vibration.

Hereinafter, the comparison between fastening force of the looseness-prevention screw thread structure according to the present invention and fastening force of a general screw thread structure in the related art will be described.

Basically, when tightening torque (fastening torque) is provided to fasten the screw, the external thread receives tensile force, and the internal thread receives compressive force. Force, which is initially applied during the engagement, refers to a preload, and an axial load caused by the tightening torque is expressed by the following Expression 1.

$$T = \frac{q}{2} d_p \tan(\beta + \rho) + \mu_n d_n \quad \text{[Expression 1]}$$

Here, T means tightening torque, q means a preload in the form of axial force, dp and dn mean diameters of the external thread and the internal thread, respectively, and β means a lead angle of the screw thread. ρ is a friction angle, and is expressed by the following Expression 2.

$$\rho = \tan \mu_p \quad \text{[Expression 2]}$$

Here, µp and µn mean frictional coefficients of the external thread and the internal thread, respectively.

The fastening force of the screw is also changed in accordance with a fastening torque value, and the tightening torque required for the engagement is made with reference to a specification table of a standard screw. In addition, because the tightening torque value is changed in accordance with the lead angle of the screw thread, the fastening force is also changed in accordance with the lead angle of the screw thread. Further, it can be proved that the change in fastening force provides an effect of preventing looseness in the event of vibration.

In the present invention, tightening torque (kgf·cm) corresponding to the standard screw was applied, and the preload (kgf) was calculated by inputting the tightening torque to Expression 1 and Expression 2.

In addition, in all cases, a deformable body-deformable body contact condition is provided to a boundary between the external thread and the internal thread, and the frictional coefficient of the screw thread is applied with reference to relevant documents.

Further, based on the aforementioned proposed optimum design, a screw having the screw thread with the first tangential portion and the second tangential portion was manufactured and subjected to a vibration test together with a screw used in the related art.

The test was performed under a vibration test condition based on ISO7481 of the International Organization for Standardization, and FIGS. 16 and 17 illustrate vibration test jigs 50 and 60 used for the present experiment. Further, the experiment condition and the experiment process using the vibration test jigs 50 and 60 will be described below.

First, screw portions of a bolt and a nut are lubricated in a first jig 50 and a second jig 60 in FIGS. 16 and 17, and the bolt is fastened to a first fastening unit 52 and a second fastening unit 62 until the nut to be tested including a chamfered portion protrudes by at least 2 pitches.

Further, the assembly is heated to a maximum operating temperature ±5° C. specified in the dimension standard of the nut or the drawings, and this temperature is maintained for about 6 hours. Thereafter, the assembly is extracted from an oven and then slowly cooled to an ambient temperature, and the nut is separated.

In addition, under the same lubrication condition, a spacer and a washer are fitted and the nut is assembled to the same bolt, and then the nut is tightened by applying torque specified in the supply standard. Thereafter, the nut is loosened so that a looseness-prevention part is completely pulled out, the assembly is mounted to a block slot, tightening and loosening are repeated three times, and the same bolt is tightened at the fourth time.

Further, a reference line is indicated from the end of the bolt to the nut, a friction portion is lightly lubricated with synthetic oil, and whether the spacer may be freely moved in the slot is tested.

The assembly is mounted into an appropriate vibration generator, and the assembly is vibrated in a vibration region for sixteen minutes and forty seconds corresponding to 30,000 cycles. Further, during the entire test process, whether the assembly may be freely moved in the slot is tested.

When the time has elapsed and the nut is completely loosened, the test is stopped, the nut with a defect and a fractured part are removed from the assembly, and another nut is continuously tested for the remaining time. When the time has again elapsed, the test is stopped, the assembly is taken out of the vibration generator, and a state (rotational speed) of the nut with respect to the assembly and the bolt is tested.

Finally, the nut is released and tested with the naked eye, and if necessary, the nut is cut, and a cross section of the nut, which is magnified ten times, is tested to inspect conformity with requirements of the supply standard.

During the entire process, the fastening torque was set to 150 kgf·cm which is an usual screw reference, and how the lead angle of the screw thread is changed is calculated when changing the lead angle of the screw thread. The following Table 2 shows a result of comparing vibration tests for the product to which the screw thread according to the present invention is applied and the screw manufactured by other companies in the related art.

TABLE 2

| 1<br>A Company | 2<br>B Company | 3<br>C Company | 4<br>Present Invention |
| --- | --- | --- | --- |
| 28,050 cycles | 22,740 cycles | 16,050 cycles | 30,000 cycles |

As shown in Table 2, the number 1 product, the number 2 product, and the number 3 product are the existing products that have been tested, and the number 4 product is a product designed according to the present invention.

According to the result, the looseness occurred in the number 1 product, the number 2 product, and the number 3 product at 28,050 cycles, 22,740 cycles, and 16,050 cycles during the vibration test, but the looseness occurred in the number 4 product designed according to the present invention at 30,000 cycles, and a result, which shows significantly improved looseness-prevention performance, could be obtained.

As the foregoing, the experiments for proving the looseness-prevention performance of the screw thread structure according to the present invention have been described, and hereinafter, machining tools for machining the looseness-prevention screw thread structure according to the present invention will be described.

FIGS. 18 and 19 are views illustrating machining tools for machining the looseness-prevention screw thread structure according to the present invention to make an internal thread.

The machining tool illustrated in FIG. 18 is a machining tool which is formed in the form of a tap and has a spiral cutting blade that is formed at an outer circumferential surface of a cylindrical body so as to correspond to the looseness-prevention screw thread structure according to the present invention, and the machining tool illustrated in FIG. 19 is formed in the form of a cutting bite.

The tools for machining the looseness-prevention screw thread, which have the aforementioned shapes, may easily machine the looseness-prevention screw thread structure according to the present invention to make an internal thread on an inner circumferential surface of the nut or an inner circumferential surface of a hole formed in an opposing object.

Further, FIGS. 20 to 23 are views illustrating machining tools for machining the looseness-prevention screw thread structure according to the present invention to make an external thread.

The machining tool illustrated in FIG. 20 is formed in the form of dies in which cutting blades, which correspond to the looseness-prevention screw thread structure according to the present invention, are formed radially on an inner circumferential surface of a body, and the machining tool illustrated in FIG. 21 is formed in the form of a cutting bite. Further, the machining tools illustrated in FIGS. 22 and 23 are formed in the form of rolling dies.

The tools for machining the looseness-prevention screw thread, which have the aforementioned shapes, may easily machine the looseness-prevention screw thread structure according to the present invention to make an external thread on an outer circumferential surface of the bolt or an outer circumferential surface of a cylindrical object.

While the exemplary embodiments according to the present invention have been described above, it is obvious to those skilled in the art that the present invention may be specified in other particular forms in addition to the aforementioned exemplary embodiments without departing from the spirit or the scope of the present invention. Accordingly, it should be understood that the aforementioned exemplary embodiments are not restrictive but illustrative, and thus the present invention is not limited to the aforementioned description, and may be modified within the scope of the appended claims and the equivalent range thereto.

The invention claimed is:

1. A looseness-prevention screw thread structure and a thread crest of an opposing fastening object, comprising:
   a screw thread having a predetermined pitch;
   a no-load flank which is an inclined surface in a direction in which the screw thread is advanced;
   wherein the no-load flank comprises:
      a first tangential portion which abuts against an arc portion formed at the thread crest of the opposing fastening object; and
      a second tangential portion which has a preset angle with respect to the first tangential portion and abuts against the arc portion; and
   a load flank which is an inclined surface in a direction in which the screw thread is retracted,
   wherein the no-load flank and the load flank are formed at both sides of the screw thread,
   wherein the screw thread is formed to have an angle of 60°,
   wherein the first tangential portion has an angle of 5° with respect to a horizontal line,
   wherein the second tangential portion has an angle of 35° with respect to the horizontal line, so that the second tangential portion has a larger angle with respect to the horizontal line than the first tangential portion,
   wherein the first tangential portion and the second tangential portion have a smaller angle with respect to the horizontal line than the load flank,
   wherein the first tangential portion and the second tangential portion simultaneously abut against and come into contact with the arc portion in a state in which the screw thread is fastened to the opposing fastening object.

2. A tool for machining the looseness-prevention screw thread structure according to claim 1 to make an internal thread.

3. A tool for machining the looseness-prevention screw thread structure according to claim 1 to make an external thread.

* * * * *